(12) United States Patent
Wilson (10) Patent No.: US 12,060,007 B2
(45) Date of Patent: Aug. 13, 2024

(54) REAR VIEW MIRROR ASSEMBLY (71) Applicant: Danen Wilson, Chandler, AZ (US)

(72) Inventor: Danen Wilson, Chandler, AZ (US)

(*) Notice: Subject to any disclaimer, the term of this patent is extended or adjusted under 35 U.S.C. 154(b) by 219 days.

(21) Appl. No.: 17/875,021

(22) Filed: Jul. 27, 2022

(65) Prior Publication Data

US 2024/0034240 A1 Feb. 1, 2024

(51) Int. Cl.
*G08G 1/123* (2006.01)
*B60R 1/04* (2006.01)
*B60R 1/12* (2006.01)

(52) U.S. Cl.
CPC .................. *B60R 1/12* (2013.01); *B60R 1/04* (2013.01); *B60R 2001/1215* (2013.01); *B60R 2001/1253* (2013.01); *B60R 2001/1284* (2013.01)

(58) Field of Classification Search
CPC ..... B60R 1/12; B60R 1/04; B60R 2001/1215; B60R 2001/1253; B60R 2001/1284
See application file for complete search history.

(56) References Cited

U.S. PATENT DOCUMENTS

| 6,124,647 | A | 9/2000 | Marcus |
| D618,147 | S | 6/2010 | Bellingham |
| 7,912,646 | B2 | 3/2011 | McCarthy |
| 8,004,392 | B2 | 8/2011 | DeLine |
| 8,525,703 | B2* | 9/2013 | McCarthy .......... G01C 21/3688 340/995.14 |
| 8,908,039 | B2 | 12/2014 | De Wind |
| 2003/0006888 | A1 | 1/2003 | Burchette, Jr. |
| 2003/0117728 | A1* | 6/2003 | Hutzel ................ B60R 11/0217 359/850 |
| 2006/0135216 | A1 | 6/2006 | Collavo |
| 2011/0080481 | A1* | 4/2011 | Bellingham .......... H04N 7/183 348/148 |
| 2011/0156893 | A1* | 6/2011 | Hwang ..................... B60R 1/12 340/442 |
| 2016/0159286 | A1 | 6/2016 | Harville |

FOREIGN PATENT DOCUMENTS

WO   WO2016094172   6/2016

* cited by examiner

*Primary Examiner* — Toan N Pham (57) ABSTRACT

A rear view mirror assembly includes a rear view mirror that is mounted on a windshield of a vehicle and a personal electronic device in remote communication with an extrinsic communication network for sending and receiving text messages. A display is movably integrated into the rear view mirror such that the display is visible to the driver. A communication unit is integrated into the rear view mirror and the communication unit is in communication with the display. The communication unit is in remote communication with the personal electronic device thereby facilitating the display to display text messages received from the personal electronic device. In this way the display facilitates the driver to read the text messages without requiring the driver to look away from the road upon which the vehicle is traveling.

10 Claims, 6 Drawing Sheets

REAR VIEW MIRROR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to rear view devices and more particularly pertains to a new rear view device for facilitating a driver of a vehicle to read text messages on their rear view mirror. The device includes a rear view mirror and a display that is movably integrated into the rear view mirror which can be positioned in a deployed position for viewing by the driver. The device includes a personal electronic device for receiving text messages and a communication unit integrated into the rear view mirror for facilitating the text messages to be displayed on the display.

(2) Description of Related Art Including Information Disclosed Under 37 CFR 1.97 and 1.98

The prior art relates to rear view devices including a message projection device that projects messages onto a rearview mirror of a vehicle. The prior art discloses a driver assistance device that includes a global positioning system and a display that is integrated into a reflector of a rear view mirror in a vehicle. The prior art discloses a video mirror system that includes a mirror case that is mountable in a vehicle and a display that is slidably integrated into the mirror case. The prior art discloses a rear view mirror device that includes projectors mounted within a rear view mirror for projecting imagery onto a reflective element of the rear view mirror. The prior art discloses a rear view mirror device that includes a rear view mirror and a plurality of light emitters integrated into the rear view mirror for displaying a variety of pre-determined messages.

Brief Summary of the Invention

An embodiment of the disclosure meets the needs presented above by generally comprising a rear view mirror that is mounted on a windshield of a vehicle and a personal electronic device in remote communication with an extrinsic communication network for sending and receiving text messages. A display is movably integrated into the rear view mirror such that the display is visible to the driver. A communication unit is integrated into the rear view mirror and the communication unit is in communication with the display. The communication unit is in remote communication with the personal electronic device thereby facilitating the display to display text messages received from the personal electronic device. In this way the display facilitates the driver to read the text messages without requiring the driver to look away from the road upon which the vehicle is traveling.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
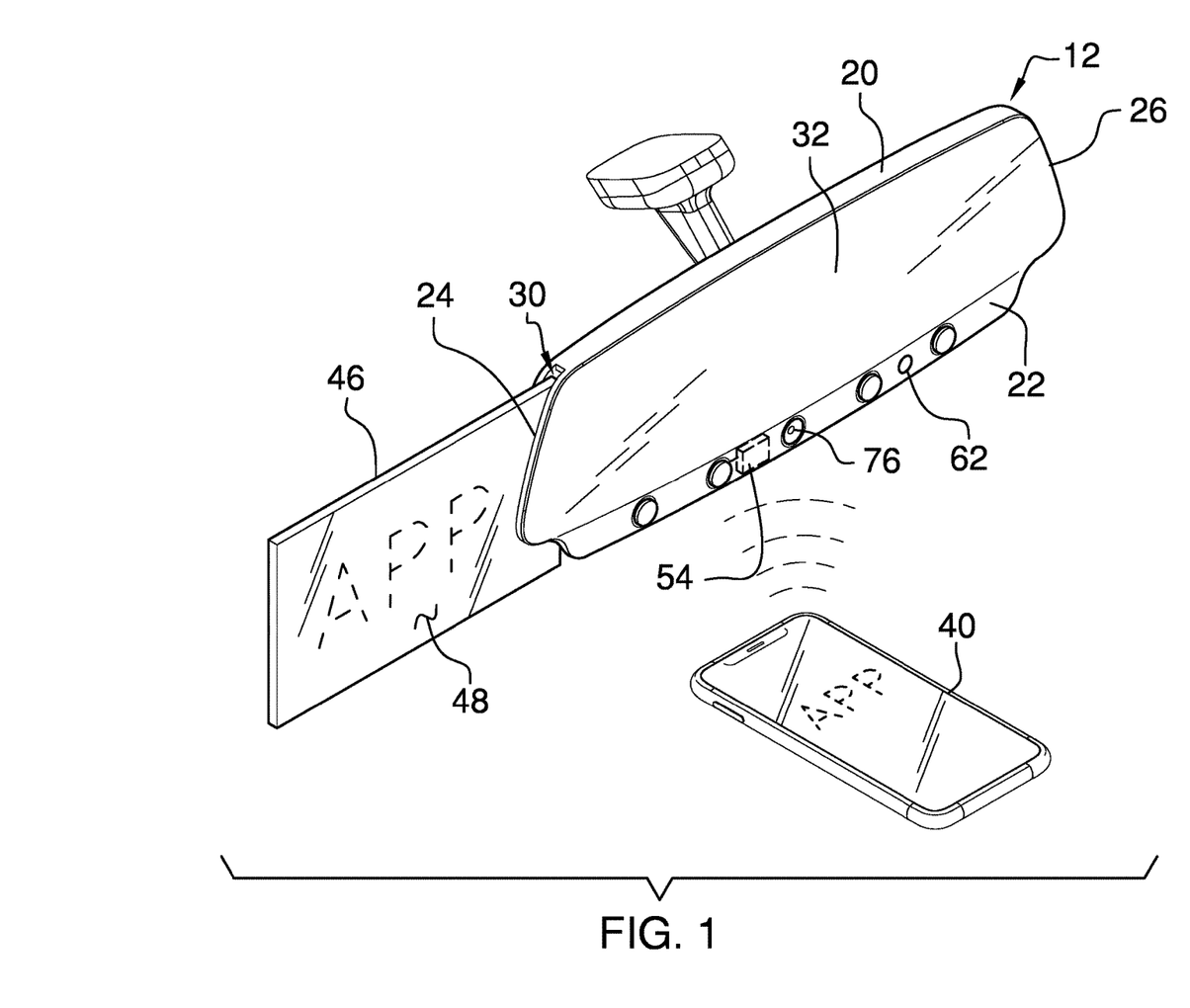
FIG. 1 is a perspective view of a rear view mirror assembly according to an embodiment of the disclosure.
Figure 2:
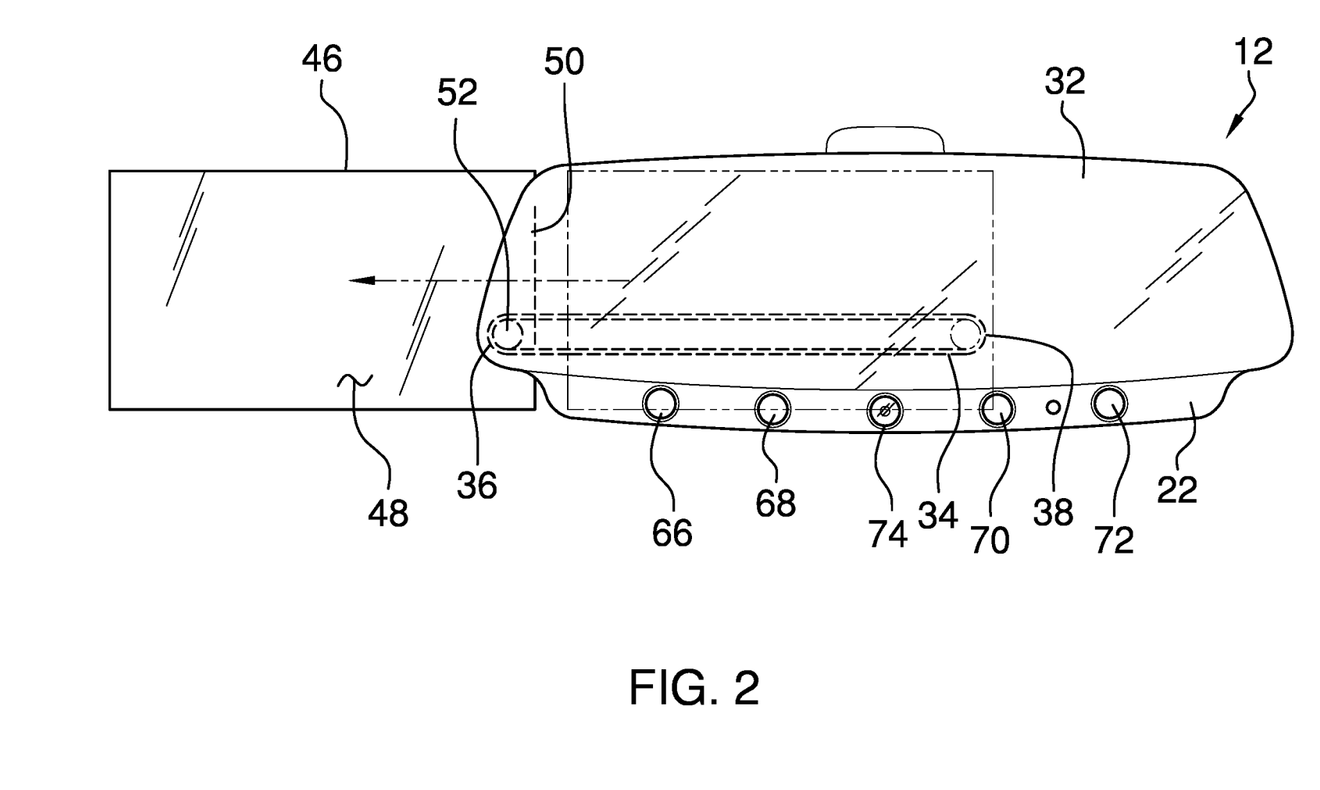
FIG. 2 is a front phantom view of an embodiment of the disclosure showing a display in a deployed position.
Figure 3:
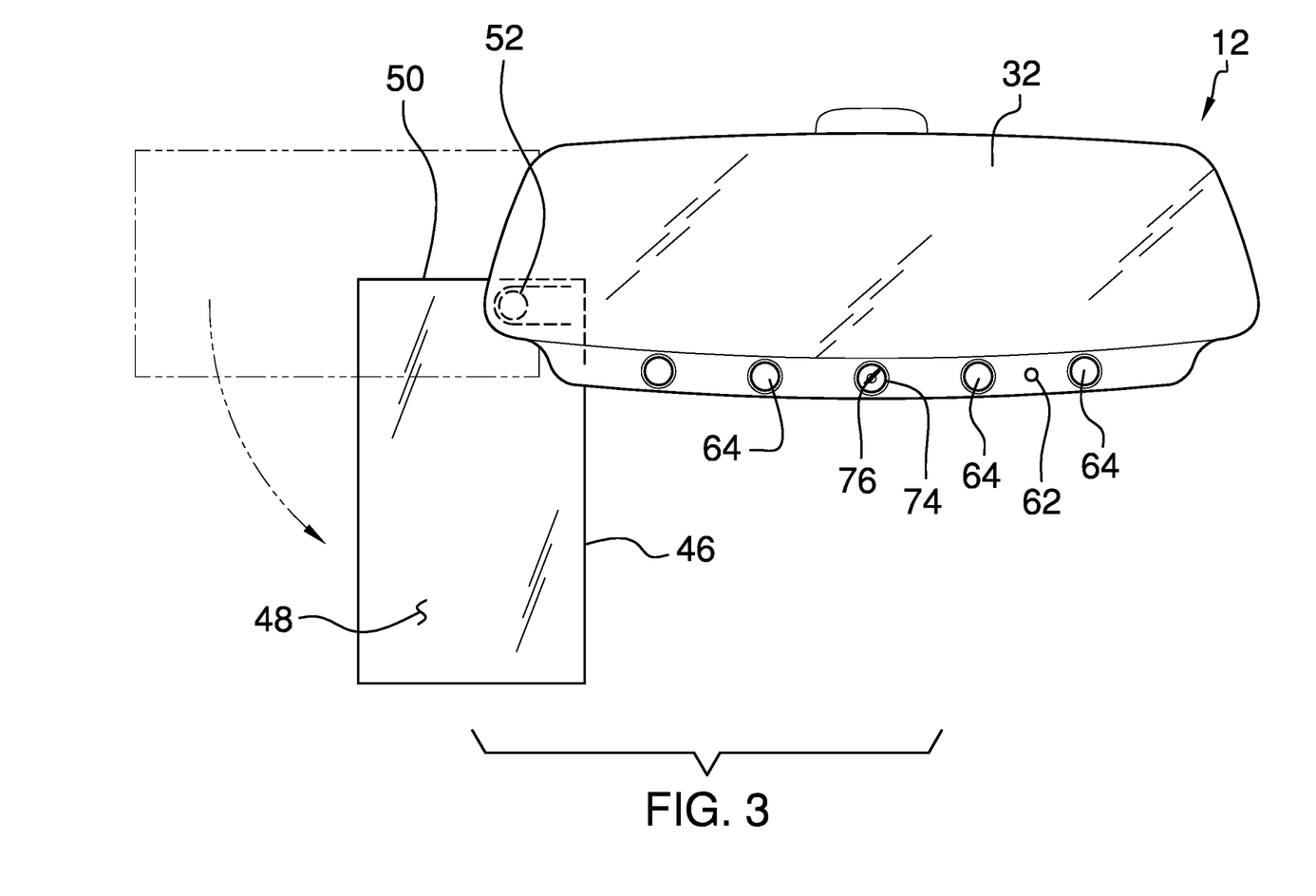
FIG. 3 is a front phantom view of an embodiment of the disclosure showing a display being pivoted downwardly.
Figure 4:
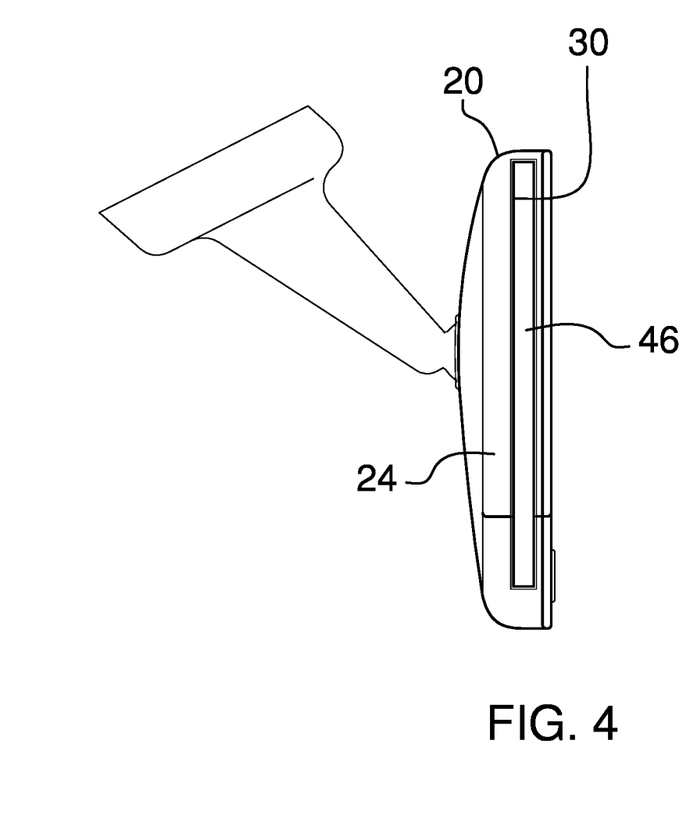
FIG. 4 is a left side view of an embodiment of the disclosure.
Figure 5:
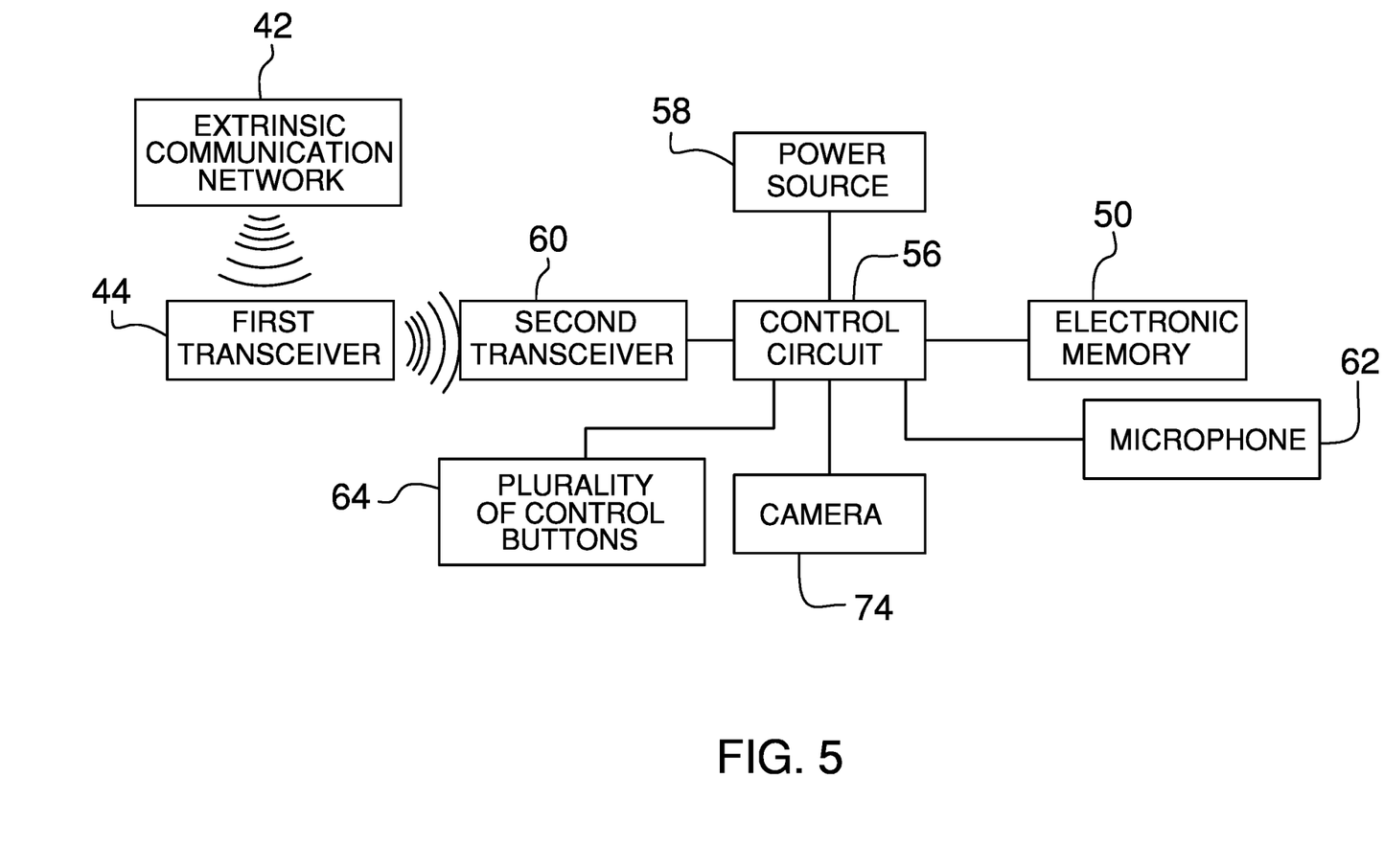
FIG. 5 is a schematic view of an embodiment of the disclosure.
Figure 6:
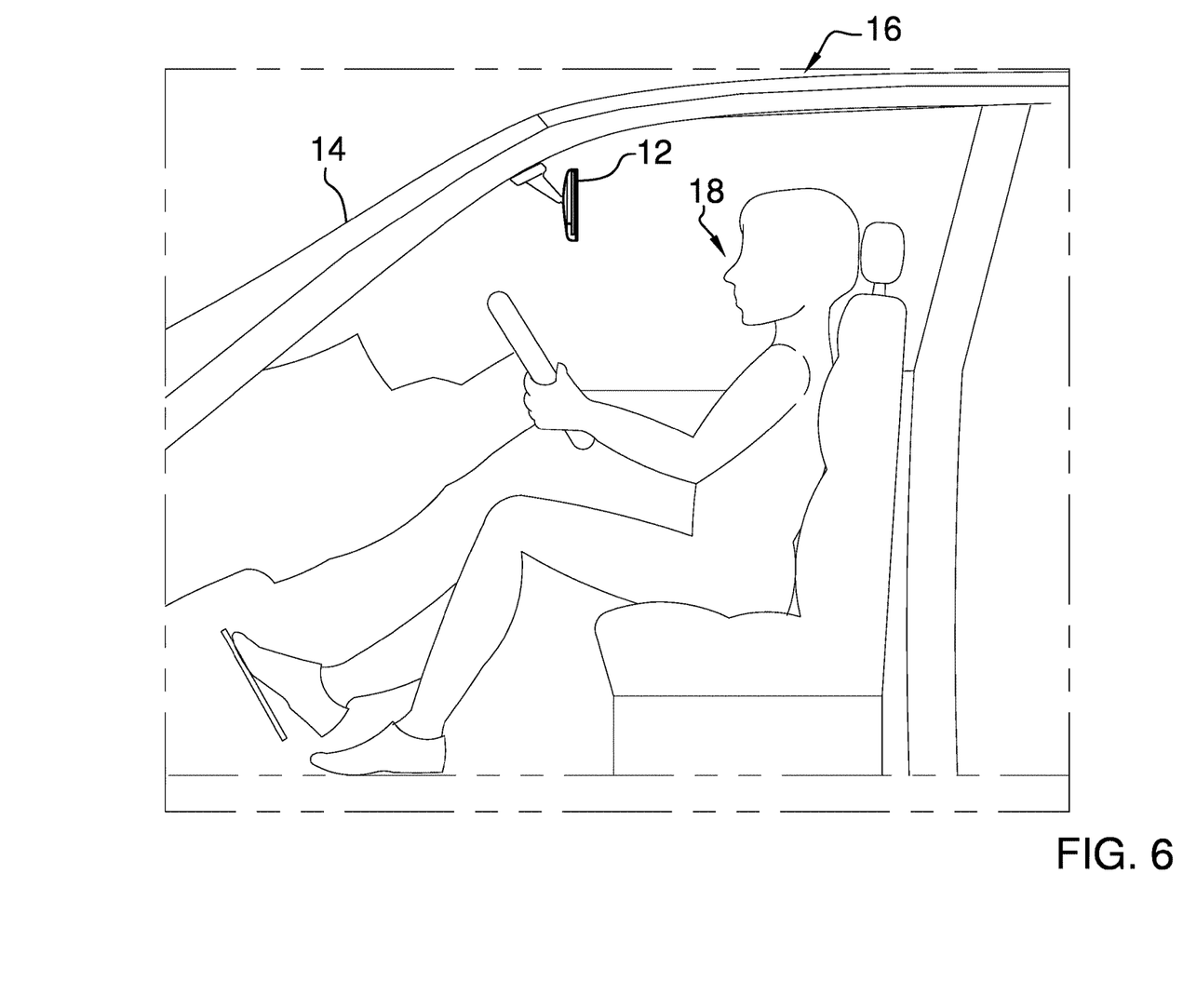
FIG. 6 is a perspective in-use view of an embodiment of the disclosure.

With reference now to the drawings, and in particular to FIGS. 1 through 6 thereof, a new rear view device embodying the principles and concepts of an embodiment of the disclosure and generally designated by the reference numeral 10 will be described.

As best illustrated in FIGS. 1 through 6, the rear view mirror assembly 10 generally comprises a rear view mirror 12 that is mounted on a windshield 14 of a vehicle 16 such that the rear view mirror 12 is visible to a driver 18 of the vehicle 16. The vehicle 16 may be a passenger vehicle, a cargo vehicle or any other type of motorized vehicle that would commonly be driven on public roadways. The rear view mirror 12 includes a housing 20 that has a front side 22, a first lateral side 24, a second lateral side 26 and a bottom side 28. The housing 20 is substantially hollow and the first lateral side 24 has an opening 30 extending into an interior of the housing 20. The rear view mirror 12 includes a reflector 32 that is integrated into the front side 22, and the reflector 32 is comprised of a light reflecting material to facilitate the driver 18 to view an area behind the vehicle 16.

A track 34 is integrated into the front side 22 of the housing 20 such that the track 34 is positioned within the housing 20. The track 34 extends from the first lateral side 24 of the housing 20 toward the second lateral side 26 of the housing 20. Additionally, the track 34 is spaced from the bottom side 28 of the housing 20 and the track 34 is oriented to extend along the bottom side 28 of the housing 20. The track 34 has a first end 36 and a second end 38 and each of the first end 36 and the second end 38 are rounded.

A personal electronic device 40 provided and the personal electronic device 40 is in remote communication with an extrinsic communication network 42 for sending and receiving text messages. The personal electronic device 40 includes a first transceiver 44 that is in wireless communication with the extrinsic communication network 42. The personal electronic device 40 may comprise a smart phone or other type of electronic device 40 that would commonly be employed for sending and receiving text messages. Additionally, the first transceiver 44 may comprise a radio frequency transceiver and the first transceiver 44 may employ Bluetooth communication protocols.

A display 46 is movably integrated into the rear view mirror 12 and the display 46 is positionable in a deployed position having the display 46 extending outwardly from the rear view mirror 12 such that the display 46 is visible to the driver 18. The display 46 is positionable in a stored position having the display 46 being contained within the rear view mirror 12. The display 46 has a forward surface 48 and a lateral edge 50, and the display 46 extends outwardly from the opening 30 in the first lateral side 24 of the housing 20 of the rear view mirror 12 when the display 46 is positioned in the deployed position. Moreover, the forward surface 48 of the display 46 lies on a plane that is coplanar with the front side 22 of the housing 20 of the rear view mirror 12 when the display 46 is in the deployed position. The display 46 may comprise a liquid crystal display or other type of electronic display. A peg 52 is coupled to and extends away from the forward surface 48 of the display 46 and the peg 52 is positioned adjacent to the lateral edge 50 of the display 46. The peg 52 slidably engages the track 34 in the housing for slidably attaching the display 46 to the track 34.

A communication unit 54 is integrated into the rear view mirror 12 and the communication unit 54 is in communication with the display 46. The communication unit 54 is in remote communication with the personal electronic device 40 thereby facilitating the display 46 to display text messages received from the personal electronic device 40. In this way the display 46 facilitates the driver 18 to read the text messages without requiring the driver 18 to look away from the road upon which the vehicle 16 is traveling. The communication unit 54 comprises a control circuit 56 that is integrated into the housing 20 of the rear view mirror 12. The control circuit 56 is electrically coupled to the display 46 and the control circuit 56 includes an electronic memory 50 which stores a database comprising a plurality of voice commands. Additionally, the control circuit 56 is electrically coupled to a power source 58 comprising an electrical system of the vehicle 16.

The communication unit 54 includes a second transceiver 60 that is integrated into the housing 20. The second transceiver 60 is in communication with the first transceiver 44 such that the second transceiver 60 receives the text messages from the personal electronic device 40. Additionally, the second transceiver 60 is electrically coupled to the control circuit 56 thereby facilitating the display 46 to display the text messages received from the personal electronic device 40. The second transceiver 60 may comprise a radio frequency transceiver or the like and the second transceiver 60 may employ Bluetooth communication protocols. The communication unit 54 includes a microphone 62 that is integrated into the housing 20 for detecting voice commands. The microphone 62 is electrically coupled to the control circuit 56 thereby facilitating the control circuit 56 to respond to voice commands received by the microphone 62 which correspond to respective voice commands stored in the electronic memory 50.

A plurality of control buttons 64 is included and each of the control buttons 64 is movably integrated into the front side 22 of the housing 20. The control buttons 64 are electrically coupled to the control circuit 56 and each of the control buttons 64 controls respective operational parameters of the communication unit 54. The plurality of control buttons 64 includes a sync button 66, a map button 68, a voice command button 70 and a mirror control button 72. The second transceiver 60 is synchronized with the first transceiver 44 when the sync button 66 is manipulated. The display 46 displays map indicia received from the personal electronic device 40 when the map button 68 is manipulated thereby aiding the driver 18 with navigating. Additionally, the display 46 is actuated to respond to voice commands received from the microphone 62 when the voice control button is manipulated.

A camera 74 is coupled to the rear view mirror 12 to capture imagery of an interior of the vehicle 16. The camera 74 is positioned on the front side 22 of the housing of the rear view mirror 12 and the camera 74 is electrically coupled to the control circuit 56. The camera 74 comprises an electronic video camera that is capable of capturing video footage and still imagery. Additionally, the camera 74 comprises a lens 76 that is integrated into the front side 22 of the housing 20.

In use, the personal electronic device 40 is synchronized with the communication unit 54 thereby facilitating the communication unit 54 to received text messages that are received by the personal electronic device 40. The display 46 can be urged into the deployed position at any time the driver 18 wishes. Additionally, as is most clearly shown in FIG. 3, the display 46 can be pivoted downwardly when the display 46 is positioned in the deployed position, depending on the driver's 18 preference. The display 46 displays the text messages that are received by the personal electronic device 40 thereby facilitating the driver 18 to read the text messages on the display 46. In this way the driver 18 does not have to look at the personal electronic device 40, which might be lying in their lap for example, in order to read the text message. Thus, the driver 18 can continue looking forward while reading the text message on the display 46 thereby facilitating the driver 18 to safely operate the vehicle 16. The voice command button 70 can be depressed to facilitate the display 46 to respond to voice commands and the map button 68 can be depressed to facilitate the display 46 to display a map on the display 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rear view mirror assembly for displaying text messages from a personal electronic device, said assembly comprising:
   a rear view mirror being mounted on a windshield of a vehicle wherein said rear view mirror is configured to be visible to a driver of the vehicle;
   a personal electronic device being in remote communication with an extrinsic communication network for sending and receiving text messages;
   a display being movably integrated into said rear view mirror, said display being positionable in a deployed position having said display extending outwardly from said rear view mirror wherein said display is configured to be visible to the driver, said display being positionable in a stored position having said display being contained within said rear view mirror;
   a communication unit being integrated into said rear view mirror, said communication unit being in communication with said display, said communication unit being in remote communication with said personal electronic device thereby facilitating said display to display text messages received from said personal electronic device wherein said display is configured to facilitate the driver to read the text messages without requiring the driver to look away from the road upon which the vehicle is traveling; and
   a camera being coupled to said rear view mirror wherein said camera is configured to capture imagery of an interior of the vehicle.

2. The assembly according to claim 1, wherein:
   said rear view mirror includes a housing having a front side, a first lateral side, a second lateral side and a bottom side, said housing being substantially hollow, said first lateral side having an opening extending into an interior of said housing, said rear view mirror including a reflector being integrated into said front side, said reflector being comprised of a light reflecting material wherein said reflector is configured to facilitate the driver to view an area behind the vehicle; and
   said assembly includes a track being integrated into said front side of said housing such that said track is positioned within said housing, said track extending from said first lateral side of said housing toward said second lateral side of said housing, said track being spaced from said bottom side of said housing, said track being oriented to extend along said bottom side of said housing.

3. The assembly according to claim 2, wherein said display has a forward surface and a lateral edge, said display extending outwardly from said opening in said lateral side of said housing of said rear view mirror when said display is positioned in said deployed position, said forward surface of said display lying on a plane being coplanar with said front side of said housing of said rear view mirror when said display is in said deployed position.

4. The assembly according to claim 3, further comprising a peg being coupled to and extending away from said forward surface of said display, said peg being positioned adjacent to said lateral edge of said display, said peg slidably engaging said track in said housing for slidably attaching said display to said track.

5. The assembly according to claim 2, wherein said communication unit comprises a control circuit being integrated into said housing of said rear view mirror, said control circuit being electrically coupled to said display, said control circuit including an electronic memory storing a database comprising a plurality of voice commands, said control circuit being electrically coupled to a power source comprising an electrical system of the vehicle.

6. The assembly according to claim 5, wherein:
   said personal electronic device includes a first transceiver being in wireless communication with the extrinsic communication network; and
   said communication unit includes a second transceiver being integrated into said housing, said second transceiver being in communication with said first transceiver such that said second transceiver receives the text messages from said personal electronic device, said second transceiver being electrically coupled to said control circuit thereby facilitating said display to display the text messages received from said personal electronic device.

7. The assembly according to claim 6, wherein said communication unit includes:
   a microphone being integrated into said housing; and
   a plurality of control buttons, each of said control buttons being movably integrated into said front side of said housing, said control buttons being electrically coupled to said control circuit, each of said control buttons controlling respective operational parameters of said communication unit, said plurality of control buttons including a sync button, a map button, a voice command button and a mirror control button, said second transceiver being synchronized with said first transceiver when said sync button is manipulated, said display displaying map indicia received from said personal electronic device when said map button is manipulated, said display being actuated to respond to voice commands received from said microphone when said voice control button is manipulated.

8. The assembly according to claim 5, wherein said communication unit includes a microphone being integrated into said housing for detecting voice commands, said microphone being electrically coupled to said control circuit thereby facilitating said control circuit to respond to voice commands received by said microphone which correspond to respective voice commands stored in said electronic memory.

9. The assembly according to claim 5, wherein said camera is positioned on said front side of said housing of said rear view mirror, said camera being electrically coupled to said control circuit.

10. A rear view mirror assembly for displaying text messages from a personal electronic device, said assembly comprising:
    a rear view mirror being mounted on a windshield of a vehicle wherein said rear view mirror is configured to be visible to a driver of the vehicle, said rear view mirror including a housing having a front side, a first lateral side, a second lateral side and a bottom side, said housing being substantially hollow, said first lateral side having an opening extending into an interior of said housing, said rear view mirror including a reflector being integrated into said front side, said reflector being comprised of a light reflecting material wherein said reflector is configured to facilitate the driver to view an area behind the vehicle;

a track being integrated into said front side of said housing such that said track is positioned within said housing, said track extending from said first lateral side of said housing toward said second lateral side of said housing, said track being spaced from said bottom side of said housing, said track being oriented to extend along said bottom side of said housing;

a personal electronic device being in remote communication with an extrinsic communication network for sending and receiving text messages, said personal electronic device including a first transceiver being in wireless communication with the extrinsic communication network;

a display being movably integrated into said rear view mirror, said display being positionable in a deployed position having said display extending outwardly from said rear view mirror wherein said display is configured to be visible to the driver, said display being positionable in a stored position having said display being contained within said rear view mirror, said display having a forward surface and a lateral edge, said display extending outwardly from said opening in said lateral side of said housing of said rear view mirror when said display is positioned in said deployed position, said forward surface of said display lying on a plane being coplanar with said front side of said housing of said rear view mirror when said display is in said deployed position;

a peg being coupled to and extending away from said forward surface of said display, said peg being positioned adjacent to said lateral edge of said display, said peg slidably engaging said track in said housing for slidably attaching said display to said track;

a communication unit being integrated into said rear view mirror, said communication unit being in communication with said display, said communication unit being in remote communication with said personal electronic device thereby facilitating said display to display text messages received from said personal electronic device wherein said display is configured to facilitate the driver to read the text messages without requiring the driver to look away from the road upon which the vehicle is traveling, said communication unit comprising:

a control circuit being integrated into said housing of said rear view mirror, said control circuit being electrically coupled to said display, said control circuit including an electronic memory storing a database comprising a plurality of voice commands, said control circuit being electrically coupled to a power source comprising an electrical system of the vehicle;

a second transceiver being integrated into said housing, said second transceiver being in communication with said first transceiver such that said second transceiver receives the text messages from said personal electronic device, said second transceiver being electrically coupled to said control circuit thereby facilitating said display to display the text messages received from said personal electronic device;

a microphone being integrated into said housing for detecting voice commands, said microphone being electrically coupled to said control circuit thereby facilitating said control circuit to respond to voice commands received by said microphone which correspond to respective voice commands stored in said electronic memory; and a plurality of control buttons, each of said control buttons being movably integrated into said front side of said housing, said control buttons being electrically coupled to said control circuit, each of said control buttons controlling respective operational parameters of said communication unit, said plurality of control buttons including a sync button, a map button, a voice command button and a mirror control button, said second transceiver being synchronized with said first transceiver when said sync button is manipulated, said display displaying map indicia received from said personal electronic device when said map button is manipulated, said display being actuated to respond to voice commands received from said microphone when said voice control button is manipulated; and a camera being coupled to said rear view mirror wherein said camera is configured to capture imagery of an interior of the vehicle, said camera being positioned on said front side of said housing of said rear view mirror, said camera being electrically coupled to said control circuit.

* * * * *